(12) United States Patent
Ooi et al.

(10) Patent No.: US 12,474,590 B2
(45) Date of Patent: Nov. 18, 2025

(54) DUAL VIEW OF A DESKTOP FIELD VIA A BEAM SPLITTER COMPONENT

(71) Applicant: DELL PRODUCTS L.P., Round Rock, TX (US)

(72) Inventors: Ghee Beng Ooi, Singapore (SG); Chih Hao Kao, Singapore (SG); Lee Ming Ong, Singapore (SG); Surendran Ramachanthiran, Singapore (SG)

(73) Assignee: Dell Products L.P., Round Rock, TX (US)

( * ) Notice: Subject to any disclaimer, the term of this patent is extended or adjusted under 35 U.S.C. 154(b) by 153 days.

(21) Appl. No.: 18/392,790

(22) Filed: Dec. 21, 2023

(65) Prior Publication Data

US 2025/0208429 A1 Jun. 26, 2025

(51) Int. Cl.
G02B 27/14 (2006.01)
G02B 26/08 (2006.01)
G06F 1/16 (2006.01)

(52) U.S. Cl.
CPC ......... *G02B 27/14* (2013.01); *G02B 26/0816* (2013.01); *G06F 1/1686* (2013.01)

(58) Field of Classification Search
CPC .... G02B 26/0816; G02B 27/14; G06F 1/1686
See application file for complete search history.

(56) References Cited

U.S. PATENT DOCUMENTS

| | | | |
|---|---|---|---|
| 10,491,785 B1* | 11/2019 | Arnot | H04N 5/2222 |
| 2019/0187469 A1* | 6/2019 | Segal | G02B 27/142 |
| 2023/0126024 A1 | 4/2023 | Goh et al. | |
| 2023/0199279 A1 | 6/2023 | Kao et al. | |
| 2024/0272446 A1* | 8/2024 | Kunz | G03B 17/561 |

* cited by examiner

Primary Examiner — Vinh T Lam
(74) Attorney, Agent, or Firm — Larson Newman, LLP

(57) ABSTRACT

A beam splitter component for a camera of a display device for an information handling system includes a beam splitter glass, an angular adjustment component, and a mounting structure. The beam splitter glass is positioned in front of the camera. The angular adjustment component is in physical communication with the beam splitter. The angular adjustment component secures the beam splitter glass in different angles with respect to the camera. The mounting structure is in physical communication with the angular adjustment component. The mounting structure secures the beam splitter component to different locations of the display device. Based on an angle of the beam splitter glass and a location of the beam splitter component on the display device, the beam splitter component splits an image captured by the camera and displayed on the display device.

20 Claims, 9 Drawing Sheets

US 12,474,590 B2

DUAL VIEW OF A DESKTOP FIELD VIA A BEAM SPLITTER COMPONENT

FIELD OF THE DISCLOSURE

The present disclosure generally relates to information handling systems, and more particularly relates to a dual view of a desktop field via a beam splitter component.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A beam splitter component for a camera of a display device for an information handling system includes a beam splitter glass, an angular adjustment component, and a mounting structure. The beam splitter glass may be positioned in front of the camera. The angular adjustment component may be in physical communication with the beam splitter. The angular adjustment component may secure the beam splitter glass in different angles with respect to the camera. The mounting structure may be in physical communication with the angular adjustment component. The mounting structure may secure the beam splitter component to different locations of the display device. Based on an angle of the beam splitter glass and a location of the beam splitter component on the display device, the beam splitter component may split an image captured by the camera and displayed on the display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
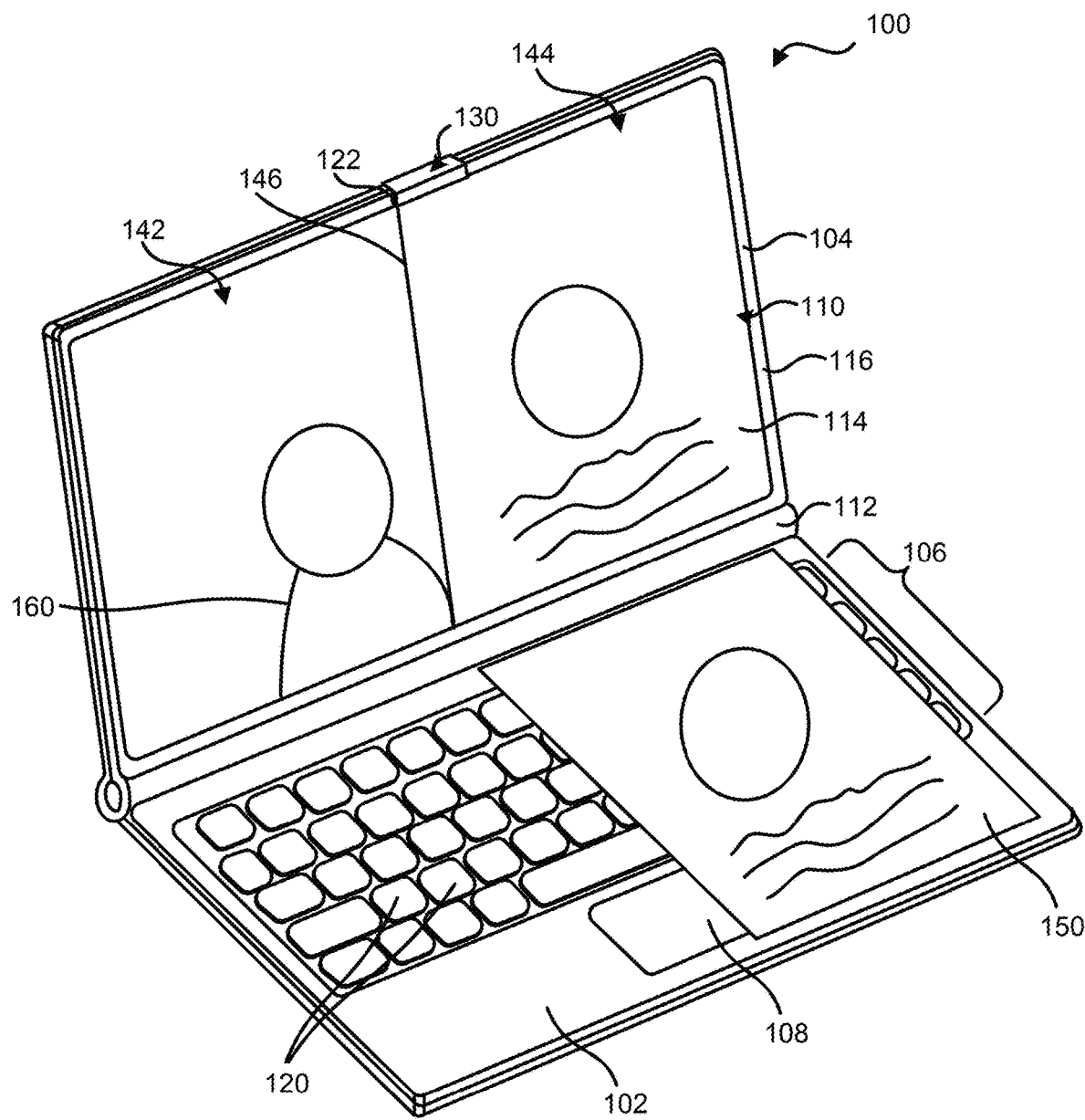
FIG. 1 is a perspective view of an information handling system according to at least one embodiment of the present disclosure.

FIG. 1 illustrates an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base portion 102 and a top 104. Base portion 102 includes a keyboard 106 and a touchpad 108, and top portion 104 includes a display device 110. In an example, touchpad 108 may be any suitable pointing device. Base portion 102 is connected top portion 104 via a mechanism 112, such as one or more hinges. Keyboard 106 includes multiple keys 120. Display device 110 may include a display screen 114 and a frame 116 around the display screen. Information handling system 100 may further include a camera 122 and a beam splitter component 130. In an example, camera 122 may be incorporated within frame 116 of display device 110. As shown in FIG. 1, beam splitter component 130 may cover a portion of camera 122. In certain examples, beam splitter component 130 may vary images captured by camera 130 and provided on display screen 114 as will be described herein.

When the information handling system 100 comprises a 2-in-1 device, mechanism 112 may enable the top portion 104 to be connected to bottom portion 102 for use as a laptop device and may enable the top portion 104 to be detached from bottom portion 102 to enable the top portion 104 to be used as a tablet information handling system. Display device 110 may include one or more light emitting devices, such as, for example, light emitting diodes (LEDs), organic LED (OLED), liquid crystal display (LCD), another type of light emitting device, or any combination thereof.

In an example, a beam splitter glass of beam splitter component 130 may be positioned to cover right half of camera 122. The beam splitter glass may be in any suitable angular position, such as a closed position, an intermediate position, an open position, or the like. While beam splitter component 130 is positioned to cover a portion of camera 122, the beam splitter glass may enable the camera to capture image of an object, such as a paper 150, below the beam splitter component and simultaneously capture an image of any object or person in front of the camera. In an example, the left half of camera 122 may capture the image of any person in front of the camera and the beam splitter glass of beam splitter component 130 may cause the right side of the camera to capture paper 150. In this example, a left portion 142 of the display screen may provide an image 160 of a person in front of camera 122 and a right portion 144 of the display screen may provide an image of paper 150.

Figure 2:
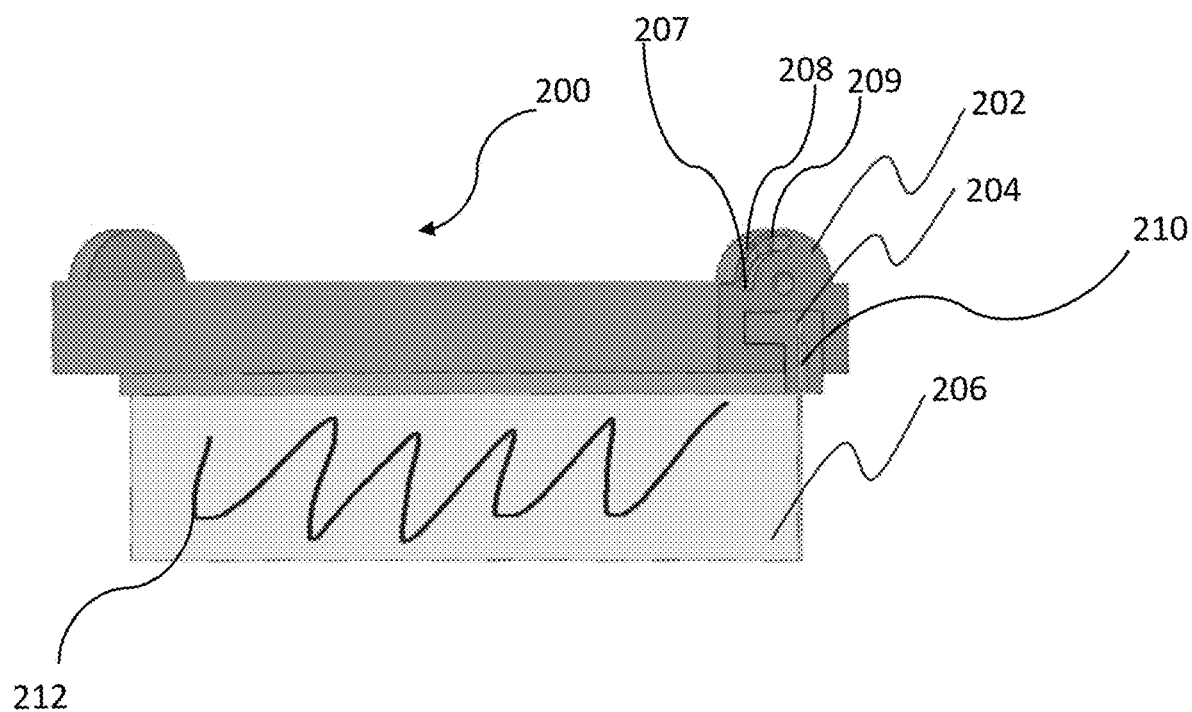
FIG. 2 is a perspective view of an angular adjustment component according to at least one embodiment of the present disclosure.

In an example, a line 146 may be provided on the display screen to divide left portion 142 and right portion 144 of the captured images. Based on different configurations of beam splitter component 130, line 146 may or may not be provided on the display screen. In different examples, beam splitter component 130 may divide the captured image of camera 122 into an upper portion and a bottom portion without varying from the scope of this disclosure. Beam splitter component 130 may enable camera 122 to capture image of multiple locations without the need to physically change the position of the camera. This arrangement further enables that any object not necessarily in front of camera 122 could be captured by the camera off of the beam splitter of beam splitter component 130. In an example, beam splitter component 130 may be incorporated within frame FIG. 2 illustrates an angular adjustment component 200 according to at least one embodiment of the present disclosure. Angular adjustment component 200 includes a main portion 202, a beam splitter holder 204, and a beam splitter glass 206. Main portion 202 includes multiple snap holes 207, 208, and 209. Main portion 202 includes a channel to receive beam splitter holder 204 which securely holds beam splitter holder within the main portion. Beam splitter holder 204 has a slit 210 opening towards a bottom edge of the beam splitter holder, which may allow beam splitter glass 206 to slide inside the beam splitter holder. Angular adjustment component 200 may include additional components without varying from the scope of this disclosure.

In certain examples, a size or flexibility of slit 210 in beam splitter holder 204 may securely hold beam splitter glass 206 within the beam splitter holder and thereby angular adjustment component 200. In an example, beam splitter glass 206 may include a coating 212 that may affect the transparency or opaqueness of the beam splitter glass. In certain examples, different beam splitter glasses 206 may be changed or replaced within beam splitter holder 204 to change the level of transparency or opaqueness of coating 212 on the current beam splitter glass of angular adjustment component 200. In an example, as the level of opaqueness increases of coating 212 an amount of a background image captured by a camera, such as camera 122 of FIG. 1, behind the beam splitter holder 204 may decrease and a reflected image, such as paper 150 of FIG. 1, captured off the beam splitter glass may increase. As the level of opaqueness decreases and the transparency level increase, an amount of the background image captured by the camera may increase and an amount of the reflected image may decrease. In an example, a maximum level of opaqueness for coating 212 may be defined as a mirror coating. For example, the maximum level of opaqueness for coating 212 may prevent a camera from capturing a background image and cause the camera to capture only a reflected imaged.

In an example, holes 207, 208, and 209 within main portion 202 may vary an angle of angular adjustment component 200 which in turn enables beam splitter glass 206 to be adjusted in various different angles with respect to a camera, such as camera 122 in FIG. 1, on which the angular adjustment component is mounted. Holes 207, 208, and 209 may snap fit on a portion of a mounting structure, such as a mounting structure 302 of FIG. 3 below. In an example, the movement of angular adjustment component 200 may be controlled by holes 204, 208, and 209.

Figure 3:
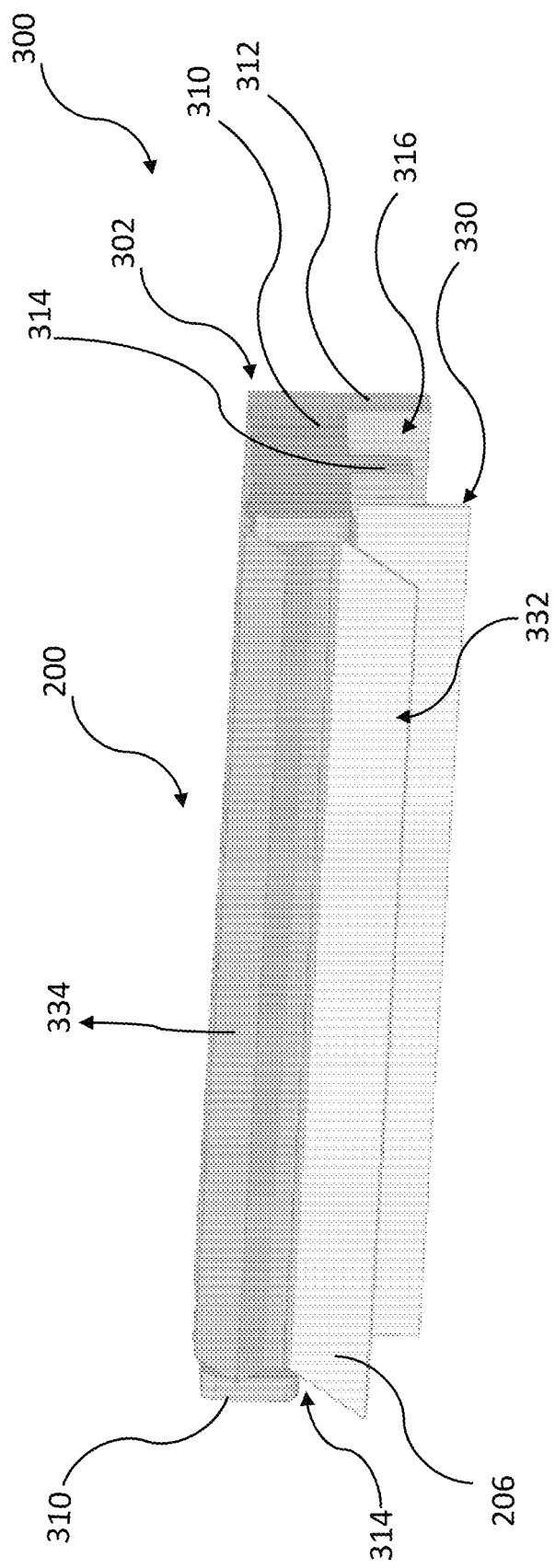
FIGS. 3 and 4 are perspective views of a beam splitter component according to at least one embodiment of the present disclosure.

In an example, holes 207, 208, and 209 may enable angular adjustment component 200 and beam splitter glass 206 to stay fixed in a particular position by restricting any movement of the angular adjustment component and beam splitter glass. This restriction of movement may prevent an accidental touch by an individual from moving angular adjustment component 200 beam splitter glass 206 from one position to another. When the post of a mounting structure, such as mounting structure 302 of FIG. 3, is snap fitted into one of holes 207, 208, and 209, angular adjustment portion 200 and beam splitter glass 206 may be fixed in a particular angular position. For example, when the post is snap fitted into hole 207, angular adjustment portion 200 and beam splitter glass 206 may be in an open position.

When the post is snap fitted into hole 208, angular adjustment portion 200 and beam splitter glass 206 may be in an intermediate position. When the post is snap fitted into hole 209, angular adjustment portion 200 and beam splitter glass 206 may be in a closed position. When a post of a mounting structure, such as mounting structure 302 of FIG. 3, is released from within one of holes 207, 208, and 209, angular adjustment portion 200 and beam splitter glass 206 may move to change an angular position of the beam splitter glass. In certain examples, main portion 202 enables the angular adjustment component 200 to be securely mounted in a fixed position and at the same time allow beam splitter glass 206 to be adjusted in different angles.

Figure 4:
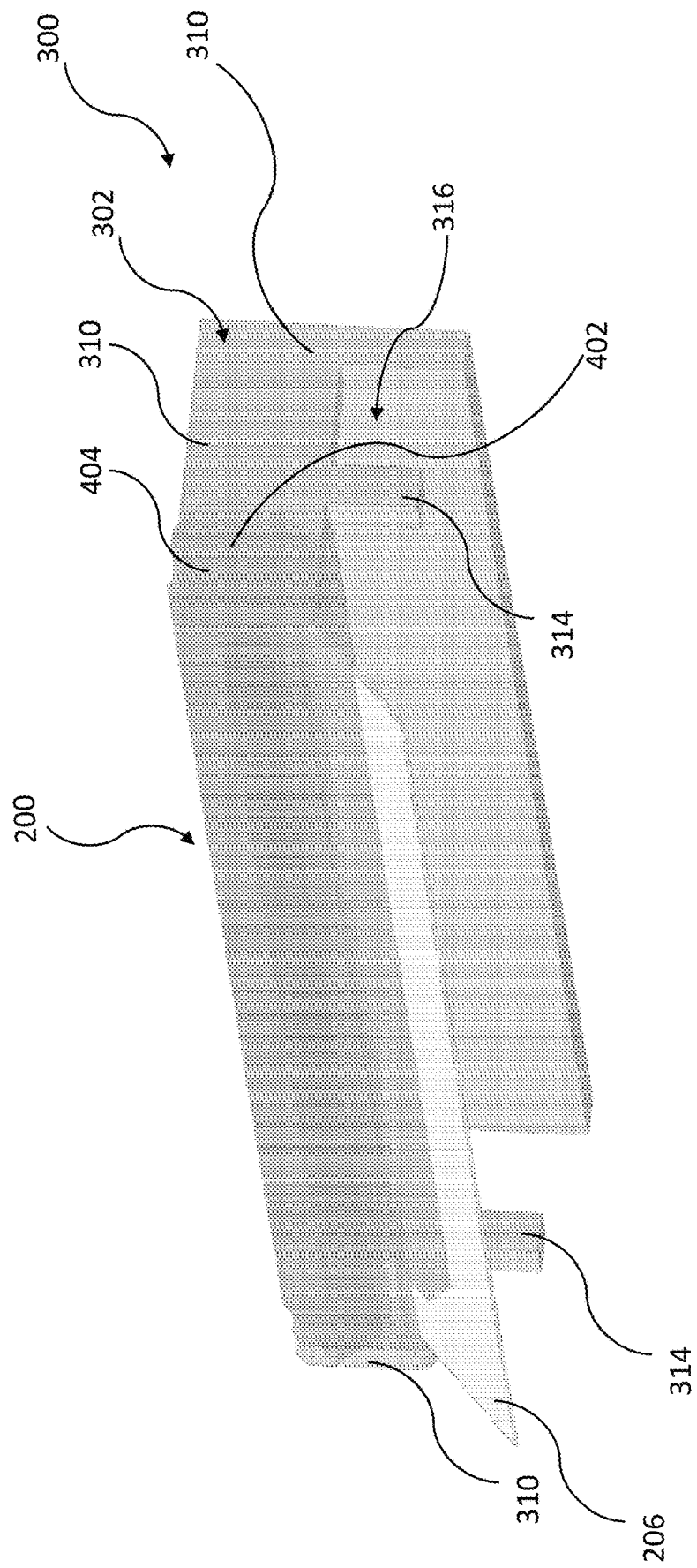

FIGS. 3 and 4 illustrate perspective view of a beam splitter component 300 according to at least one embodiment of the present disclosure. Beam splitter component 300 may be substantially similar to beam splitter component 130 of FIG. 1. Beam splitter component 300 includes angular adjustment component 200 along with a mounting structure 302. The mounting structure 302 includes side walls 310, a back wall 312, tabs 314, and a channel 316. Mounting structure 302 may include additional components without varying from the scope of this disclosure.

Referring now to FIG. 3, side walls 310 may be in physical communication with angular adjustment component 200, such that the angular adjustment component is located in between the two side walls. Back wall 312 may be positioned perpendicular to side walls 310 of mounting structure 302, and may extend in a substantially parallel direction as tabs 314. Channel 316 may be formed between back wall 312 and tabs 314. In an example, channel 316 may enable mounting structure 302 to be positioned on top of a display device, such as display device 110 of information handling system 100 of FIG. 1. In certain examples, beam splitter glass 206 may be adjusted in different positions, including but not limited to a down position 330 and an intermediate position 332. In an example, a force, in the direction of arrow 334, on angular adjustment component 200 may cause beam splitter glass 206 to rotate between down position 330 and intermediate position 332.

Referring now to FIG. 4, mounting structure 302 may further include a different post on the inner surface of each of side walls 310, such as post 402 illustrated in FIG. 4. The sides of the angular adjustment component 200 include holes 404 which may enable the angular adjustment component to snap fit with posts 402 of mounting structure 302. In an example, holes 404 may enable angular adjustment component 200 may rotate around posts 402. In an example, the rotation of angular adjust component 200 around posts 402 may enable beam splitter glass 206 to be positioned in different angles.

Figure 5:
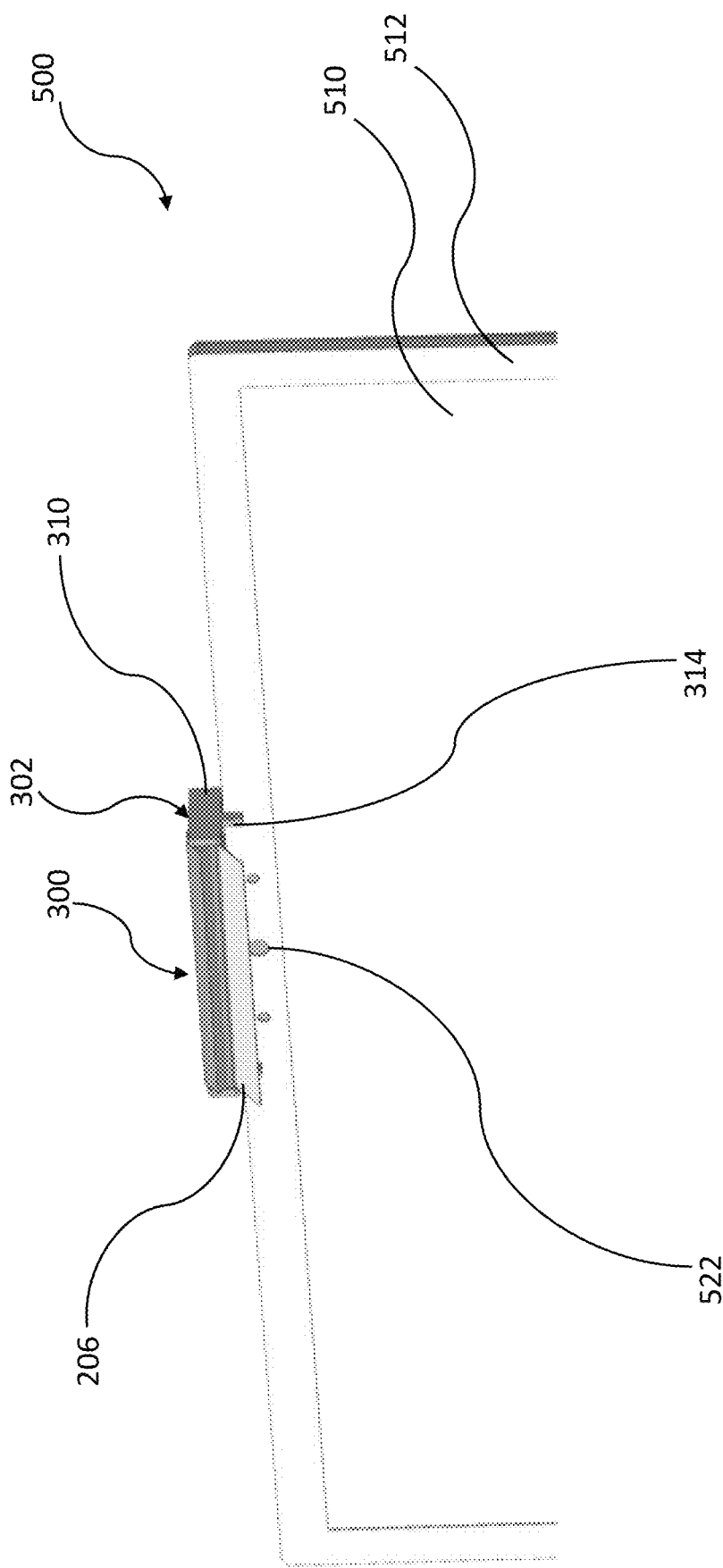
FIGS. 5 and 6 are diagrams of a portion of an information handling system according to at least one embodiment of the present disclosure.
Figure 6:
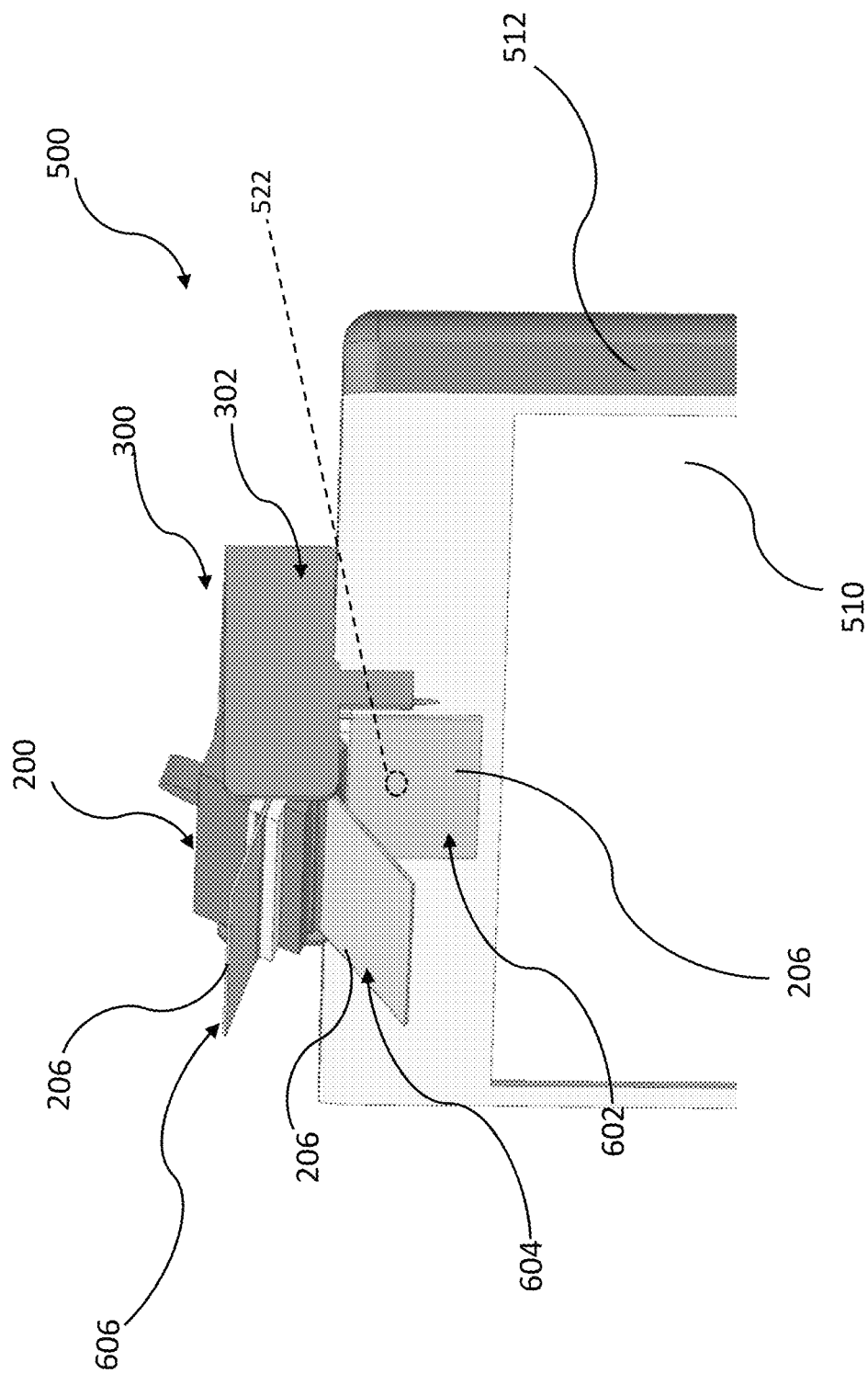

FIGS. 5 and 6 illustrate a portion of an information handling system 500 according to at least one embodiment of the present disclosure. Information handling system 500 may be substantially similar to information handling system 100 of FIG. 1. Information handling system 500 includes a display device 500 including a screen 510, a frame 512, a camera 522, and beam splitter component 300. In an example, camera 522 may be located with frame 512. In an example, beam splitter component 300 may be placed in physical communication with frame 512. Information handling system 500 may include additional components without varying from the scope of this disclosure.

Referring now to FIG. 5, camera 522 may be located on the top edge of frame 512. In certain examples, tabs 314 of mounting structure 302 may be in physical communication with a front surface of frame 512 and back wall 312 may be in physical communication with a back surface of the frame. In this example, tabs 314 may be visible to an individual sitting in front of screen 510 of information handling system 500. In an example, beam splitter component 300 may be placed at any location along the top of frame 512, such as toward one end or another, with camera 522 in the center of the beam splitter component, with camera on one edge or another of the beam splitter component, or the like. While mounting structure 302 of beam splitter component 300 is in physical communication with the top of frame and located near camera 522, beam splitter glass 206 may be moved to different angles with respect to the camera device 522. In an example, the different positions of beam splitter glass 206 may adjust a view of camera device 522.

Referring now to FIG. 6, Angular adjustment component 200 further includes an adjustment tab 610. In certain examples, a force exerted against adjustment tab 610 may cause beam splitter glass 206 to be positioned at different angles or angular positions 602, 604 and 606. With the feature of adjusting the beam splitter glass 206 in different positions including but not limited to a closed position 602, an intermediate position 604 and an open position 606, the beam splitter splits the image captured by the camera device 522 based on the location of the beam splitter component on the display device 510.

Figure 7:
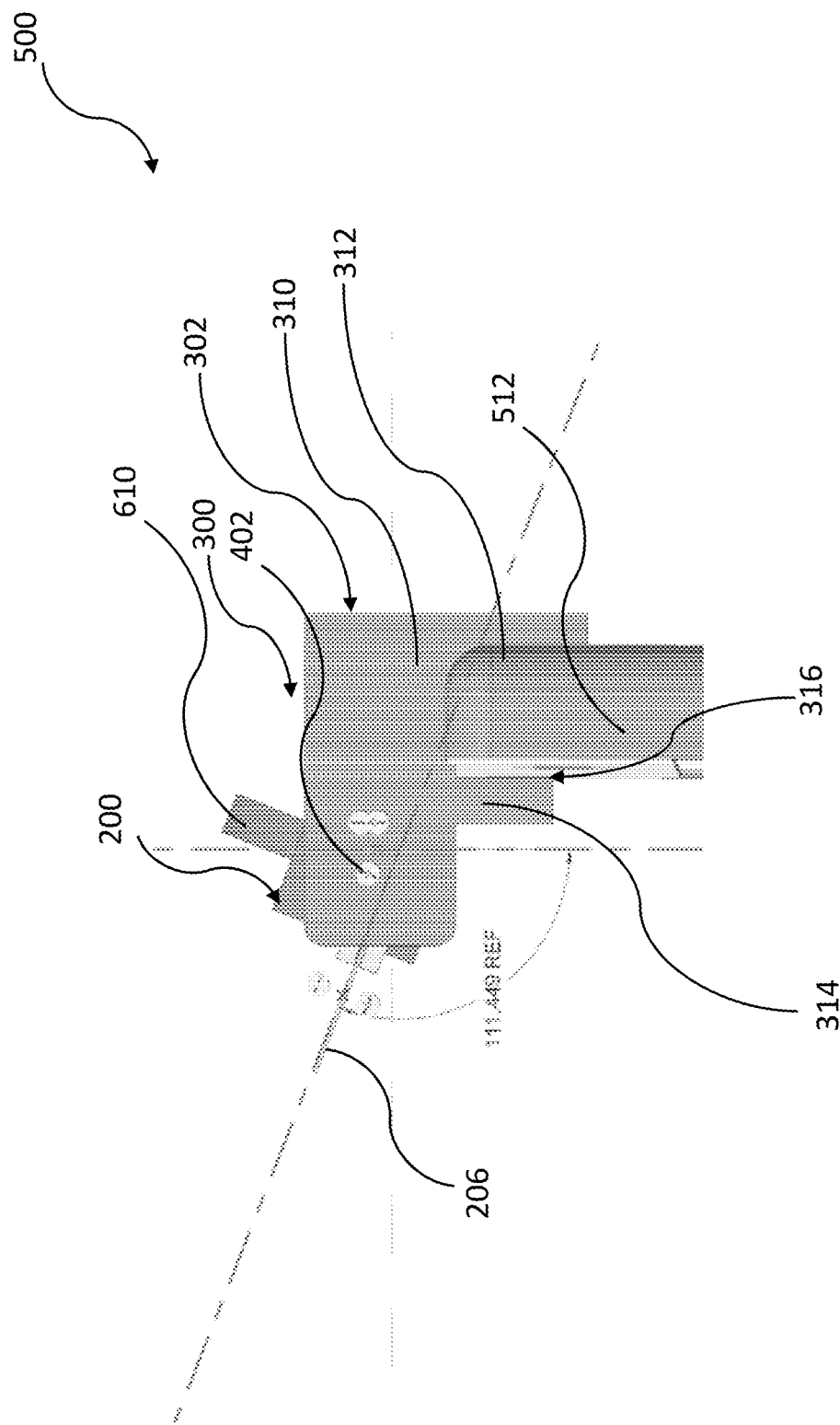
FIG. 7 is a side view of a portion of information handling system according to at least one embodiment of the present disclosure.

FIG. 7 illustrates a side view of a portion of information handling system 500 according to at least one embodiment of the present disclosure. Information handling system 500 includes beam splitter component 300 and frame 512. Mounting structure 302 of beam splitter component 300 may be positioned on top of frame 512. In an example, frame 512 may slide in channel 316 of mounting structure 302, which may support beam splitter component 300 on frame 512. Angular adjustment component 200 and beam splitter glass 206 may rotate around post 402 of mounting structure 302. In an example, the movement of the beam splitter glass 206 may be controlled by a force exerted on adjustment tab 610.

Figure 8:
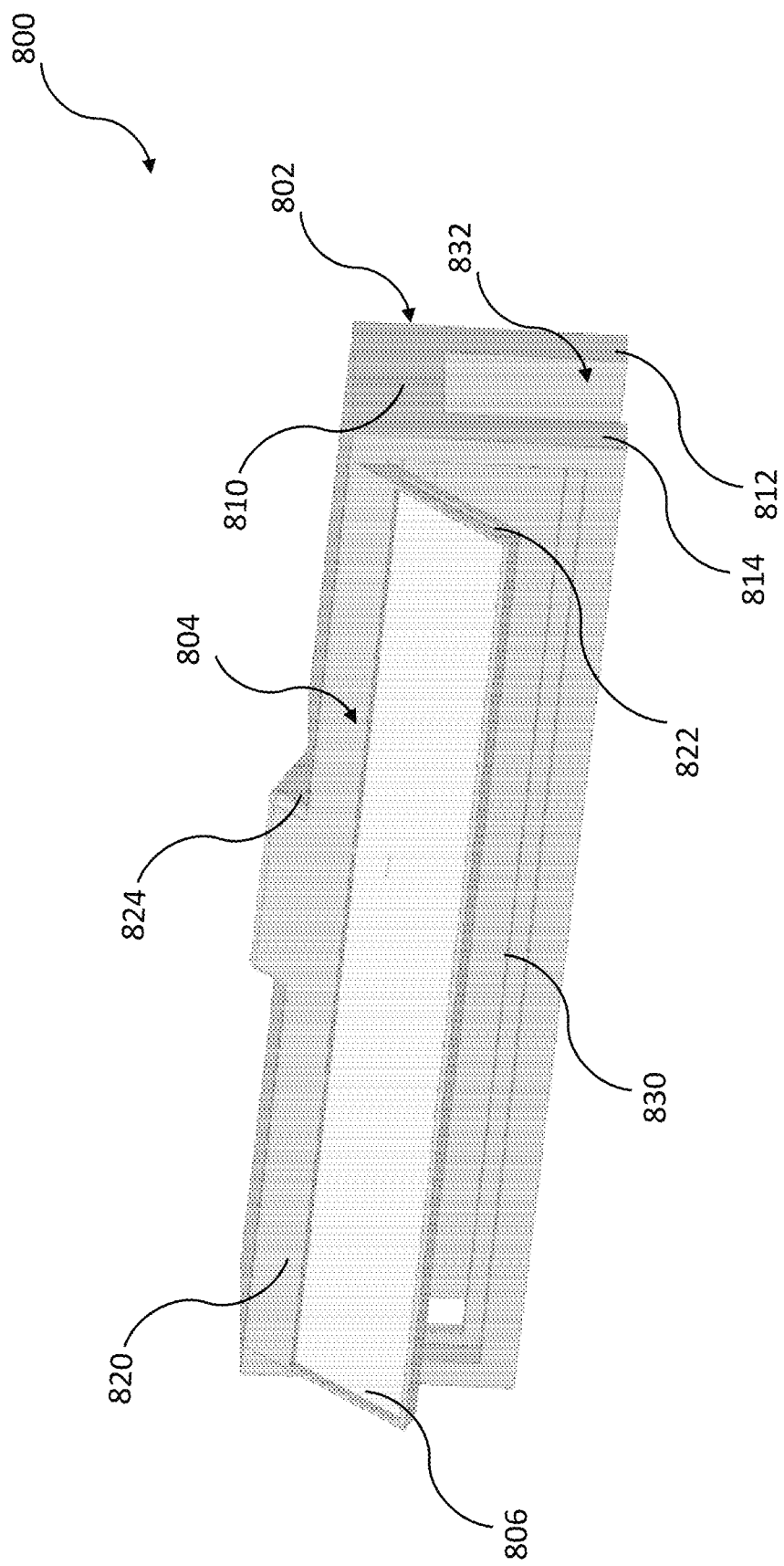
FIG. 8 is a front perspective view of a beam splitter component according to at least one embodiment of the present disclosure.

FIG. 8 illustrates a beam splitter component 800 according to at least one embodiment of the present disclosure. Beam splitter component 800 includes a mounting structure 802, an angular adjustment component 804, and a beam splitter glass 806. Mounting structure 802 includes a main portion 810, a rear structure 812, and a front structure 814. Angular adjustment component 804 includes a beam splitter holder 820, a slot 822, and an adjustment tab 824. Front structure 814 includes a recess portion 830 that may receive angular adjustment component 804 when the angular adjustment component is in a closed position.

Figure 9:
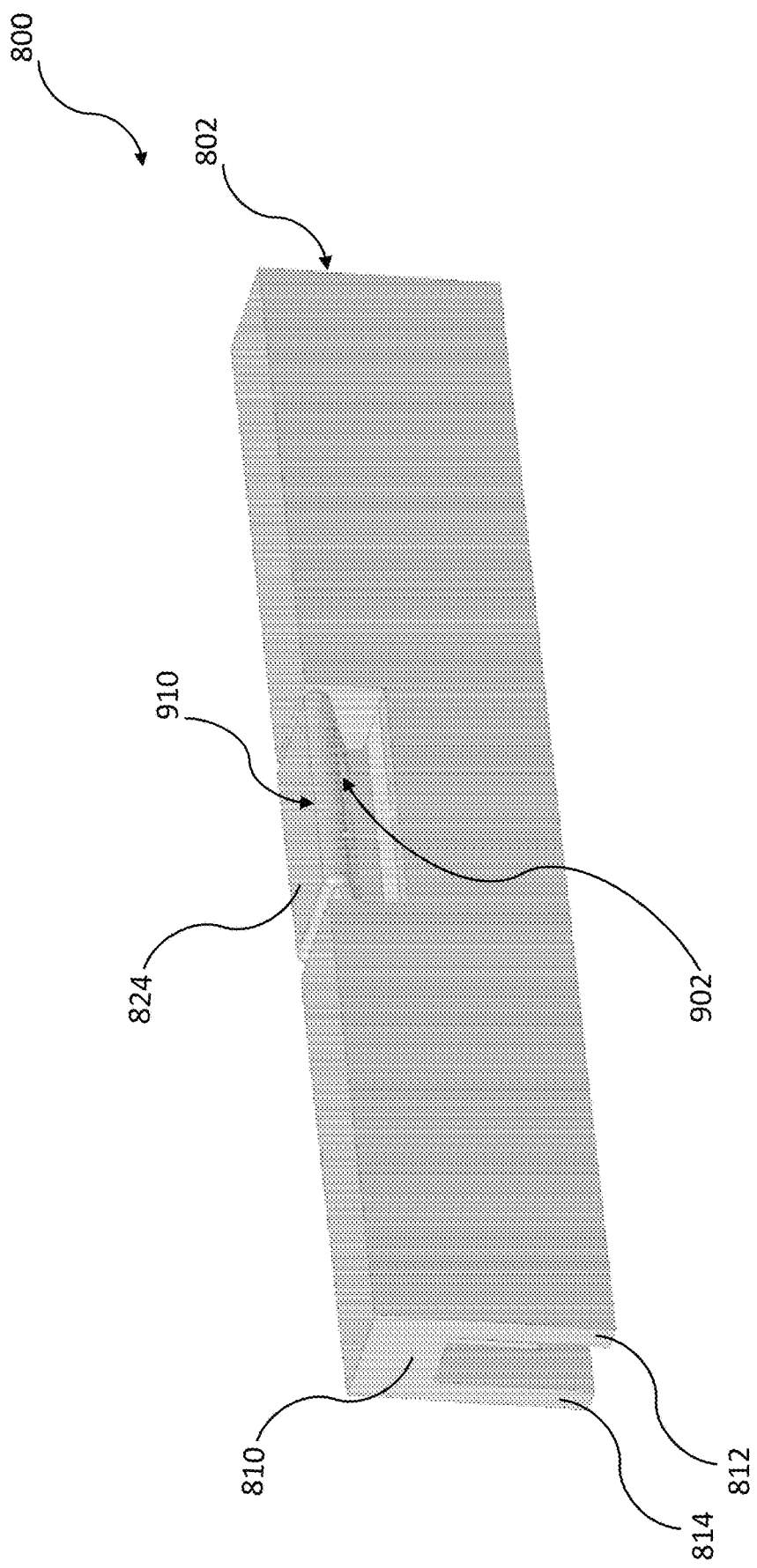
FIG. 9 is a front perspective view of a beam splitter component according to at least one embodiment of the present disclosure.

Beam splitter glass 806 may be inserted, removed, or replaced via slot 822. For example, beam splitter glass 806 may slide within beam splitter holder 820 via slot 822. In an example, mounting structure 802 includes a channel 832 between the rear structure 812 and the front structure 814. Channel 832 may allow beam splitter component 800 to be positioned on a display device of an information handling system, such as information handling system 100 of FIG. 1 and information handling system 500 of FIG. 5. In certain examples, one of edges of beam splitter holder 820 or one of the edges of front structure 814 may obstruct a portion of a view from a camera, such as camera 122 of FIG. 1 or camera 522 of FIG. 5. In an example, the view obstruction from beam splitter holder and/or front structure 814 may result in an image displayed on a display screen to have a dark line, such as line 146 of FIG. 1, where the obstruction blocks the view of captured images. In FIG. 9 illustrates beam splitter component 800 according to an embodiment of the present disclosure. Main portion 810 of mounting structure 802 includes a rectangular cavity 902 along a top side of the main portion. In an example, as a force is exerted on adjustment tab 824 in the direction of arrow 910, the adjustment tab may move downwards into cavity 902. The movement of adjustment tab 824 within cavity 902 may enable angular adjustment component 804 and beam splitter glass 806 to be adjusted to different angular positions. In an example, the movement of angular adjustment component 804 and beam splitter glass 806 to different angular positions may be substantially similar to the movement of angular adjustment component 200 and beam splitter glass 206 described above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed:

1. A beam splitter component for a camera of a display device for an information handling system, the beam splitter component comprising:
   a beam splitter glass positioned in front of the camera;
   an angular adjustment component in physical communication with the beam splitter, the angular adjustment component to secure the beam splitter glass in different angles with respect to the camera; and
   a mounting structure in physical communication with the angular adjustment component, the mounting structure to secure the beam splitter component to different locations of the display device;
   wherein the beam splitter component is configured to split an image captured by the camera and displayed on the display device based on an angle of the beam splitter glass and a location of the beam splitter component on the display device.

2. The beam splitter component of claim 1, wherein the beam splitter glass includes a coating on a surface of the beam splitter glass to control an amount of light passing through the beam splitter glass.

3. The beam splitter component of claim 2, wherein the coating is customized based on a particular transparency level and a particular reflection level.

4. The beam splitter component of claim 2, wherein a maximum level of opaqueness level of the coating prevents a background image behind the beam splitter glass from being captured by the camera and enables clarity of a reflected image off the beam splitter glass.

5. The beam splitter component of claim 1, wherein a transparency level of the mirror coating is directly proportional to a quality of a reflected image captured by the camera.

6. The beam splitter component of claim 1, wherein the angular adjustment component further comprises: a main portion, and a beam splitter holder, wherein the main portion includes a channel to receive the beam splitter holder.

7. The beam splitter component of claim 6, wherein the beam splitter holder includes a slit opening towards a bottom edge of the beam splitter holder.

8. The beam splitter component of claim 6, wherein the beam splitter holder and the beam splitter glass are configured to adjusted to different positions, wherein the different positions include a closed position, an intermediate position, and an open position.

9. The beam splitter component of claim 1, wherein the mounting structure a first post on a first inner surface of a first side and a second post on a second inner surface of a second side wall, and the angular adjustment component includes a first hole of a first surface and a second hole on a second surface.

10. The beam splitter component of claim 9, wherein first and second posts and the first and second holes enable the angular adjustment component to snap fit with the mounting structure.

11. The beam splitter component of claim 1, wherein the beam splitter glass is configured to split an image captured by the camera based on an angle of the beam splitter glass and a location of the beam splitter component on the display device.

12. An information handling system comprising:
    a display device including:
       a display screen; and
       a frame around the edge of the display screen;
    a camera within the frame of the display device; and
    a beam splitter component in physical communication with the frame of the display device, the beam splitter component including:
       a mounting structure in physical communication with the frame and positioned at least partially in front of the camera; and
       a beam splitter glass coupled to the mounting structure.

13. The information handling system of claim 12, wherein the beam splitter component further includes an angular adjustment component in physical communication with the mounting structure and coupled to the beam splitter glass, wherein the angular adjustment component controls an angular position of the beam splitter glass with respect to the camera.

14. The information handling system of claim 13, wherein the beam splitter glass includes a coating on a surface of the beam splitter glass to control and amount of light passing through the beam splitter glass.

15. The information handling system of claim 14, wherein the coating is customized based on a particular transparency level and a particular reflection level.

16. The information handling system of claim 13, wherein the beam splitter glass is positioned at different angles to split an image captured by the camera based on a location of the beam splitter component on the display device.

17. An information handling system comprising:
    a frame disposed around an edge of a display device;
    a camera within the frame of the display device; and
    a beam splitter component in physical communication with the frame, the beam splitter component including:
       a mounting structure in physical communication with the frame and positioned at least partially in front of the camera;
       an angular adjustment component in physical communication with the mounting structure;
       a beam splitter holder within a channel of the angular adjustment component; and
       a beam splitter glass in physical communication with the beam splitter holder, wherein the angular adjustment component controls an angular position of the beam splitter glass with respect to the camera.

18. The information handling system of claim 12, wherein the beam splitter glass includes a coating on a surface of the beam splitter glass to control and amount of light passing through the beam splitter glass.

19. The information handling system of claim 13, wherein the coating is customized based on a particular transparency level and a particular reflection level.

20. The information handling system of claim 12, wherein the beam splitter glass is positioned at different angles to split an image captured by the camera based on a location of the beam splitter component on the display device.

* * * * *